(No Model.)

F. A. BROWNELL.
PHOTOGRAPHIC PLATE HOLDER.

No. 562,168. Patented June 16, 1896.

Witnesses:
G. Willard Rich.
G. A. Roda.

Inventor,
Frank A. Brownell
by Church & Church
att'y's.

UNITED STATES PATENT OFFICE.

FRANK A. BROWNELL, OF ROCHESTER, NEW YORK, ASSIGNOR TO THE EASTMAN KODAK COMPANY, OF SAME PLACE.

PHOTOGRAPHIC-PLATE HOLDER.

SPECIFICATION forming part of Letters Patent No. 562,168, dated June 16, 1896.

Application filed April 18, 1896. Serial No. 588,147. (No model.)

*To all whom it may concern:*

Be it known that I, FRANK A. BROWNELL, of Rochester, in the county of Monroe and State of New York, have invented certain new and useful Improvements in Photographic-Plate Holders; and I do hereby declare the following to be a full, clear, and exact description of the same, reference being had to the accompanying drawings, forming a part of this specification, and to the reference-letters marked thereon.

My present invention has for its object to provide a simple and cheap holder for photographic plates or films that can be readily opened to permit the introduction or removal of the plate or film; and it consists in certain improvements and construction of parts, all as will be hereinafter described, and the novel features pointed out in the claims at the end of this specification.

Figure 1:
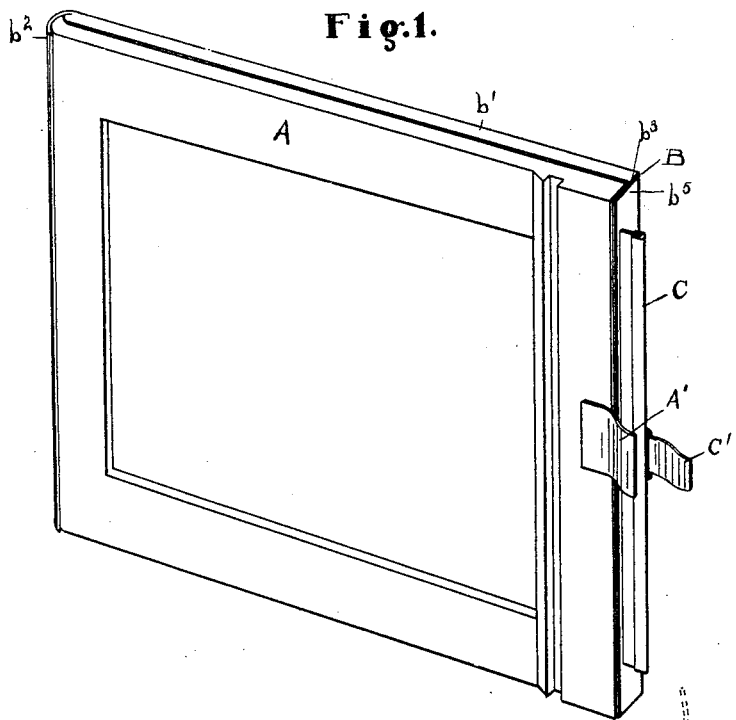
Figure 2:
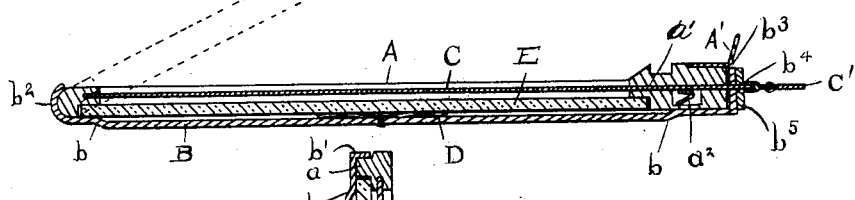
Figure 3:
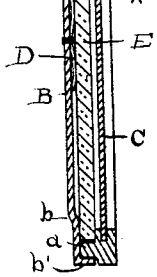

In the drawings, Figure 1 is a perspective view of a plate-holder constructed in accordance with my invention; Fig. 2, a longitudinal sectional view; Fig. 3, a cross-sectional view.

Similar reference-letters in the several figures indicate similar parts.

A indicates the frame which constitutes the front of the holder, having the opening through which the sensitized plate or film is exposed, which frame is slightly recessed at the back for the accommodation of said plate, (indicated by E,) the flanges or edges $a$ preferably engaging with slightly-raised portions $b$ of the back plate B, constituting the rear of the holder.

The sides of the frame A are provided with the usual slots or grooves for the edges of the slide or shutter C, and the end with the slot $a'$ for the entrance of said slide, the usual light-excluding flap $a^2$ being provided to prevent the entrance of light when the slide is withdrawn.

The back or cover plate B is preferably made of a single piece of metal having the marginal portions $b$ slightly raised and having on the upper and lower sides flanges $b'$, forming a light-tight joint with the sides of the frame A. At the rear end this plate is also provided with an overhanging flange $b^2$, extending slightly over the end of the frame A, and at the forward end is provided with a substantially straight flange $b^3$, provided with a slit $b^4$, corresponding to the slot $a'$ in the frame when the frame and back plate are together.

A' indicates a tag or handle on the forward end of the frame A for manipulating the latter, as will be described. The flange $b^3$ may be strengthened by the reinforcing-strip $b^5$ of heavier metal than that of which the plate B is composed, if necessary or desirable.

D indicates a spring or springs attached to the face of the plate B and arranged to hold the sensitized plate or film E against the frame A, as will be understood.

C' indicates a tag or handle on the slide for operating it.

The position of the parts when the plate or film is in position is clearly shown in Fig. 2, the overhanging flange $b^2$ extending over the rear end of the frame and holding it, while the slide C, extending through the slot $b^4$ in the flange $b^3$ and entering the ways in the sides of the frame A, locks the frame and plate B together, and the holder may then be used in the camera in the usual manner, the slide not being wholly withdrawn from the end of the frame A when making the exposure, but simply drawn out to clear the edge of the opening in the frame.

Plates may be removed from the holder by withdrawing the slide entirely and tilting the frame A on the detachable hinged connection formed by the flange $b^2$, as shown in dotted lines in Fig. 2, so that its rear end may be lifted if desired and disengaged from the flange $b^2$. Then another plate may be inserted and held in place by the reverse movement of the frame A and the insertion of the slide.

While the upper end of the flange $b^3$ may be bent inward slightly if desired to hold the frame A by friction and prevent the accidental opening of the frame when the slide is withdrawn entirely, this is not essential, as when the slide is withdrawn the holder is usually held against the camera or is in the hands of the operator in the dark room, and the hinge connection between the frame and plate, formed by bending over the flange $b^2$, need not be a detachable one, though I prefer to permit the entire separation of the parts when the slide is withdrawn.

The holder is so light and compact that a large number of plates or films can be easily carried by the operator, and particularly so when they are made very thin for holding cut sheets of film, and as it is composed of only three parts can be made at a nominal cost.

I do not wish to be understood as confining my invention to the particular means herein shown of detachably connecting the two parts of a plate-holder by means of the exposing-slide, as other modifications will readily occur to those skilled in the art.

I claim as my invention—

1. In a plate-holder, the combination with the open frame having ways for the slide, of the back plate having the slot at one end for the passage of the slide, and the slide passing through said slot and into the ways in the open frame, substantially as described.

2. In a plate-holder, the combination with the open frame having ways for the slide, of the back plate having a slot for the passage of the slide, detachable fastenings between one end of the frame and plate, and the slide passing through the slot in the plate entering the ways in the frame, substantially as described.

3. In a plate-holder, the combination with the open frame having ways for the slide, of the back plate having a projecting portion at one end, as a flange, with a slot therein, and connected to the opposite end of the frame by a detachable hinge connection, and a slide operating through the slot in the projecting portion of the back plate and entering the ways in the frame, substantially as described.

4. In a plate-holder, the combination with the open frame having ways for the slide, of the back plate having the overhanging flange at one end, and the flange at the other provided with a slot, and the slide passing through the slot in the last-mentioned flange and entering the ways in the frame, substantially as described.

5. As an article of manufacture, a plate-holder consisting of two parts hinged together at one end, and an exposing slide or shutter movable in one of the parts and engaging the other to lock them together at the end opposite the hinge, substantially as described.

6. As an article of manufacture, a plate-holder consisting of two parts, one of which is an open frame, and a slide or shutter movable over the opening in the frame and engaging both parts when moved in, to hold them together, substantially as described.

FRANK A. BROWNELL.

Witnesses:
F. F. CHURCH,
G. A. RODA.